US011015535B2

(12) United States Patent
Ajami et al.

(10) Patent No.: US 11,015,535 B2
(45) Date of Patent: May 25, 2021

(54) LIGHT-OFF DETECTION FOR GAS TURBINE ENGINES

(71) Applicant: United Technologies Corporation, Farmington, CT (US)

(72) Inventors: Andre M. Ajami, Palm City, FL (US); Sami Chukrallah, Palm Beach Gardens, FL (US); James D. Hunter, Lake Panasoffkee, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 391 days.

(21) Appl. No.: 15/905,912

(22) Filed: Feb. 27, 2018

(65) Prior Publication Data

US 2019/0264618 A1    Aug. 29, 2019

(51) Int. Cl.
| | |
|---|---|
| F02C 9/28 | (2006.01) |
| F02C 9/26 | (2006.01) |
| F02C 7/262 | (2006.01) |
| F02C 7/232 | (2006.01) |
| F02C 7/268 | (2006.01) |

(52) U.S. Cl.
CPC .............. *F02C 9/28* (2013.01); *F02C 7/232* (2013.01); *F02C 7/262* (2013.01); *F02C 7/268* (2013.01); *F02C 9/263* (2013.01); *F05D 2260/80* (2013.01); *F05D 2260/99* (2013.01); *F05D 2270/092* (2013.01); *F05D 2270/303* (2013.01); *F05D 2270/304* (2013.01); *F05D 2270/309* (2013.01); *F05D 2270/708* (2013.01)

(58) Field of Classification Search
CPC .... F02C 7/26; F02C 7/262; F02C 9/26; F02C 9/28; F05D 2260/99; F05D 2270/092; F05D 2270/303; F05D 2270/304; F05D 2270/309; F05D 2270/708
See application file for complete search history.

(56) References Cited

U.S. PATENT DOCUMENTS

| | | | |
|---|---|---|---|
| 4,736,726 A | 4/1988 | Matsuno et al. | |
| 5,107,674 A * | 4/1992 | Wibbelsman | F02C 7/26 |
| | | | 60/778 |

(Continued)

OTHER PUBLICATIONS

European Search Report for European Patent Application No. 19159818.4 completed Jul. 3, 2019.

*Primary Examiner* — Jason H Duger
(74) *Attorney, Agent, or Firm* — Carlson, Gaskey & Olds, P.C.

(57) ABSTRACT

A fuel assembly for a gas turbine engine according to an example of the present disclosure includes, among other things, a fuel valve that meters flow of fluid between a combustor and a fuel supply, and a controller in communication with the fuel assembly. The controller is programmed to receive data corresponding to a present rotational speed of a gas turbine engine component and data corresponding to at least one present flight condition, and is programmed to cause a flow rate from the fuel valve to change in response to determining that a rate of change in an acceleration rate relating to the present rotational speed meets at least one predetermined threshold. At least one predetermined threshold relates to an engine light-off event of the combustor and is based upon the at least one present flight condition.

19 Claims, 8 Drawing Sheets

(56) References Cited

U.S. PATENT DOCUMENTS

| | | | |
|---|---|---|---|
| 7,216,489 B2 | 5/2007 | Uluyol et al. | |
| 7,337,057 B2* | 2/2008 | Norman | F02C 9/00 701/100 |
| 8,381,510 B2* | 2/2013 | Brown | F02C 9/28 60/233 |
| 9,422,869 B2* | 8/2016 | Davis, Jr. | F02C 9/28 |
| 9,464,589 B2 | 10/2016 | Grumer et al. | |
| 2014/0095051 A1 | 4/2014 | Lamarre | |
| 2016/0305329 A1 | 10/2016 | Saito | |
| 2019/0186290 A1* | 6/2019 | Pascu | F01D 21/12 |

* cited by examiner

LIGHT-OFF DETECTION FOR GAS TURBINE ENGINES

BACKGROUND

This disclosure relates to engine light-off of a gas turbine engine, and more particularly to a system and method for detecting an engine light-off event.

Gas turbine engines typically include a fan delivering air into a low pressure compressor section. The air is compressed in the low pressure compressor section, and passed into a high pressure compressor section. From the high pressure compressor section the air is introduced into a combustor section where it is mixed with fuel and ignited in a combustor. Products of this combustion pass downstream over a high pressure turbine section, and then a low pressure turbine section to extract energy for driving the fan.

One technique for estimating when engine light-off has occurred includes measuring a rise in temperature of exhaust gases exiting the engine.

SUMMARY

A fuel assembly for a gas turbine engine according to an example of the present disclosure includes a fuel valve that meters flow of fluid between a combustor and a fuel supply, and a controller in communication with the fuel assembly. The controller is programmed to receive data corresponding to a present rotational speed of a gas turbine engine component and data corresponding to at least one present flight condition, and is programmed to cause a flow rate from the fuel valve to change in response to determining that a rate of change in an acceleration rate relating to the present rotational speed meets at least one predetermined threshold. At least one predetermined threshold relates to an engine light-off event of the combustor and is based upon the at least one present flight condition.

In a further embodiment of any of the foregoing embodiments, the gas turbine engine component is a rotor shaft driven by a turbine.

In a further embodiment of any of the foregoing embodiments, the at least one present flight condition includes at least one of a present altitude and a present velocity.

In a further embodiment of any of the foregoing embodiments, the controller is coupled to a plurality of sensors that detect the present rotational speed and the at least one present flight condition. The controller includes a computing device that has memory and a processor. The computing device is programmed to execute a data module and a comparison module. The data module is programmed to access the data corresponding to the present rotational speed and the at least one present flight condition. The comparison module is programmed to cause an indicator to be generated in response to determining that the rate of change in the acceleration rate meets the at least one predetermined threshold. The indicator relates to the engine light-off event.

In a further embodiment of any of the foregoing embodiments, the at least one present flight condition includes the present altitude and the present velocity. The comparison module is programmed to set at least one predetermined threshold in response to comparing the present altitude and the present velocity to respective lookup tables that include values of predetermined altitudes and predetermined velocities each with respect to rate of change in acceleration rate of the gas turbine engine component.

In a further embodiment of any of the foregoing embodiments, the gas turbine engine component is a rotor shaft that interconnects a turbine and a compressor.

In a further embodiment of any of the foregoing embodiments, the controller is programmed to cause the flow rate to change in response to determining that a consecutive number of instances of the rate of change in the acceleration rate meets the at least one predetermined threshold.

In a further embodiment of any of the foregoing embodiments, the comparison module is programmed to compare an average of two or more values of the rate of change in the acceleration rate to the at least one predetermined threshold, and is programmed to cause the flow rate to change in response to determining that an average of the plurality of values meets the at least one predetermined threshold.

In a further embodiment of any of the foregoing embodiments, the comparison module is programmed to cause the flow rate from the fuel valve to change in response to comparing the rate of change in acceleration rate and at least one command associated with the combustor, and at least one command includes a fuel flow signal to the fuel valve and an ignition signal to an ignitor of the combustor.

In a further embodiment of any of the foregoing embodiments, the engine light-off event is an initial ignition event.

In a further embodiment of any of the foregoing embodiments, the engine light-off event is a sustained combustion event.

A gas turbine engine according to an example of the present disclosure includes a spool that has a rotor shaft interconnecting a compressor and a turbine, and a combustor section that has a combustor in communication with a fuel assembly. The fuel assembly has a fuel valve coupling the combustor to a fuel supply. A controller is in communication with the fuel assembly. The controller is programmed to receive data corresponding to a present rotational speed of the spool and data corresponding to at least one present flight condition, and is programmed to cause a flow rate from the fuel valve to change in response to determining that a rate of change in an acceleration rate relating to the present rotational speed meets at least one predetermined threshold. The at least one predetermined threshold relates to an engine light-off event of the combustor and is based upon the at least one present flight condition.

In a further embodiment of any of the foregoing embodiments, the at least one present flight condition includes at least one of a present altitude and a present velocity.

In a further embodiment of any of the foregoing embodiments, the controller is programmed to set the at least one predetermined threshold in response to determining the present altitude and the present velocity.

In a further embodiment of any of the foregoing embodiments, the fuel valve is responsive to a predefined fuel schedule programmed in a fuel control.

In a further embodiment of any of the foregoing embodiments, the controller is adapted to detect the engine light-off event without exhaust gas temperature data sensed by a thermocouple or EGT probe.

A further embodiment of any of the foregoing embodiments include a fan that has a plurality of fan blades, and a second spool that drives the fan. The second spool includes a second rotor shaft interconnecting a second compressor and a second turbine.

A method for detecting an engine light-off event in a gas turbine engine according to an example of the present disclosure includes accessing data corresponding to a present rotational speed of a gas turbine engine component, setting at least one predetermined threshold with respect to at least one present flight condition, at least one present flight condition including at least one of a present altitude and a present velocity, and determining that an engine light-off event has occurred in response to comparing a rate of change in acceleration rate relating to the present rotational speed to the at least one predetermined threshold.

A further embodiment of any of the foregoing embodiments, the method includes causing a flow rate of fuel from a fuel valve to a combustor to change in response to the rate of change in the acceleration rate meeting the at least one predetermined threshold.

In a further embodiment of any of the foregoing embodiments, the step of determining that the engine light-off event has occurred includes determining whether a predetermined secondary threshold is met. The predetermined secondary threshold is defined with respect to time, rotational speed or temperature of gases in an exhaust stream, and at least one predetermined threshold is based on at least one of a thrust rating of the gas turbine engine and a presence of a supplemental oxygen source coupled to the combustor.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
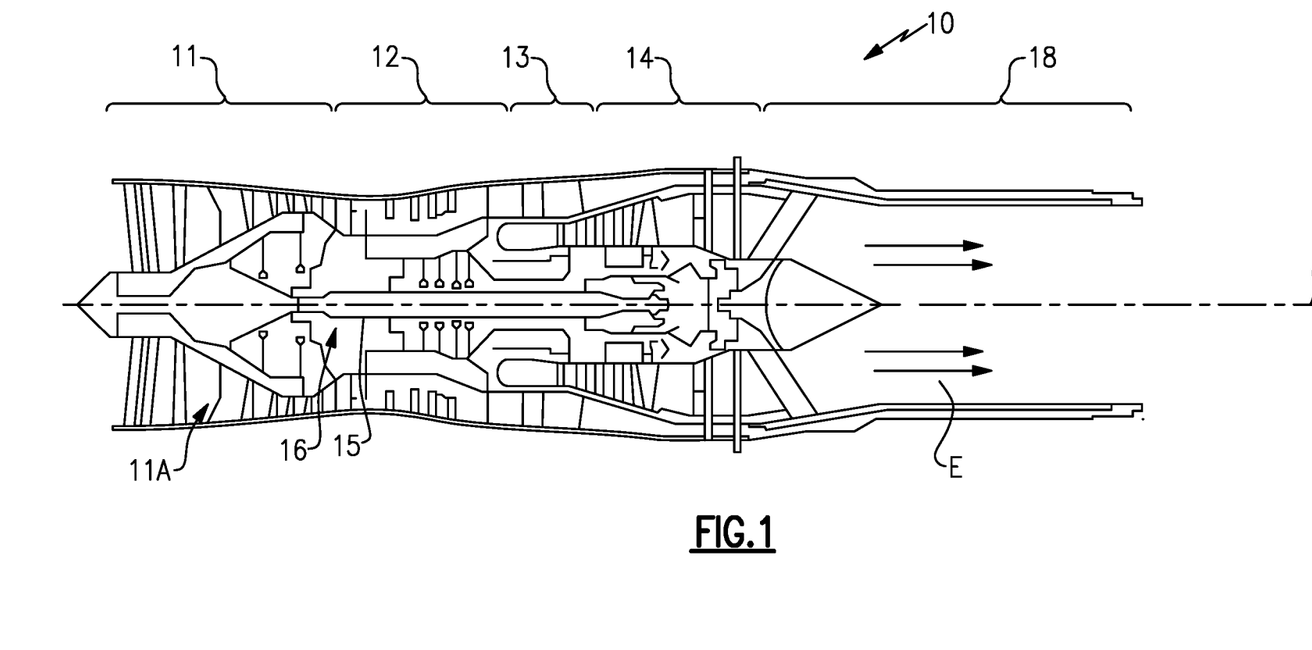
FIG. 1 illustrates a gas turbine engine, according to an embodiment.

FIG. 1 illustrates a gas turbine engine 10 according to an embodiment. The engine 10 includes a fan section 11 including a fan 11A having a row of fan blades, a compressor section 12, a combustor section 13, and a turbine section 14. Air entering into the fan section 11 is initially compressed and fed to the compressor section 12. In the compressor section 12, the incoming air from the fan section 11 is further compressed and communicated to the combustor section 13. In the combustor section 13, the compressed air is mixed with gas and ignited to generate a hot exhaust stream E. A shaft 15 interconnects the turbine section 14 to the fan and compressor sections 11, 12 to provide a single spool 16, which is rotatable about an engine central longitudinal axis A. The hot exhaust stream E is expanded through the turbine section 14 to drive the fan section 11 and the compressor section 12. The exhaust gases in the exhaust stream E flow from the turbine section 14 and through an exhaust liner assembly 18.

Figure 2:
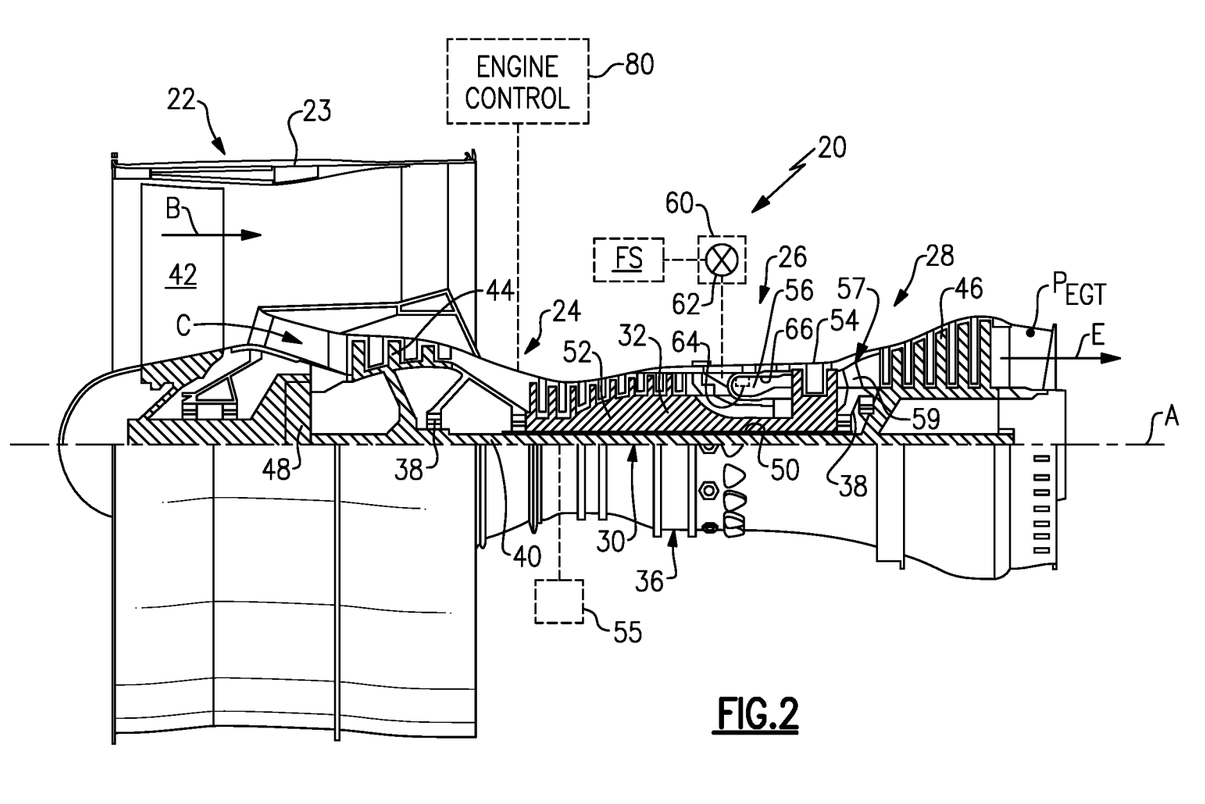
FIG. 2 illustrates a gas turbine engine, according to another embodiment.

FIG. 2 schematically illustrates a gas turbine engine 20 according to another embodiment. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct defined within a nacelle 23, and also drives air along a core flow path C for compression and communication into the combustor section 26 then expansion through the turbine section 28. Although the depicted as a two-spool turbofan gas turbine engine in the disclosed non-limiting embodiment, it should be understood that the concepts described herein are not limited to use with two-spool turbofans as the teachings may be applied to other types of turbine engines including single-spool, such as the engine 10 of FIG. 1, and three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The engine 20 can include a fuel assembly 60 including a fuel valve 62. The fuel valve 62 fluidly couples and meters flow of fuel between a fuel source FS and the combustor 56. The combustor 56 can include an igniter 64 adjacent to a combustion chamber 66. The igniter 64 can ignite a mixture of fuel from the fuel source FS and air provided to the combustion chamber 66, with the products of combustion delivered to the turbine section 28. The fuel assembly 60 can be in communication with one or more subsystems of the engine 20, such as an engine control 80. The engine control 80 includes a full authority digital engine control (FADEC) or electronic engine control (EEC) that communicates with other vehicle systems and controls the sections 22, 24, 26, 28 of the engine 20 during operation.

The example engines 10, 20 can be incorporated into a vehicle or system to provide propulsion, including commercial and military aerospace systems such as manned and unmanned aircraft and missile systems. Other subsystems including auxiliary power units (APU), and other systems such as marine and ground-based systems, can benefit from the teachings herein.

Figure 3:
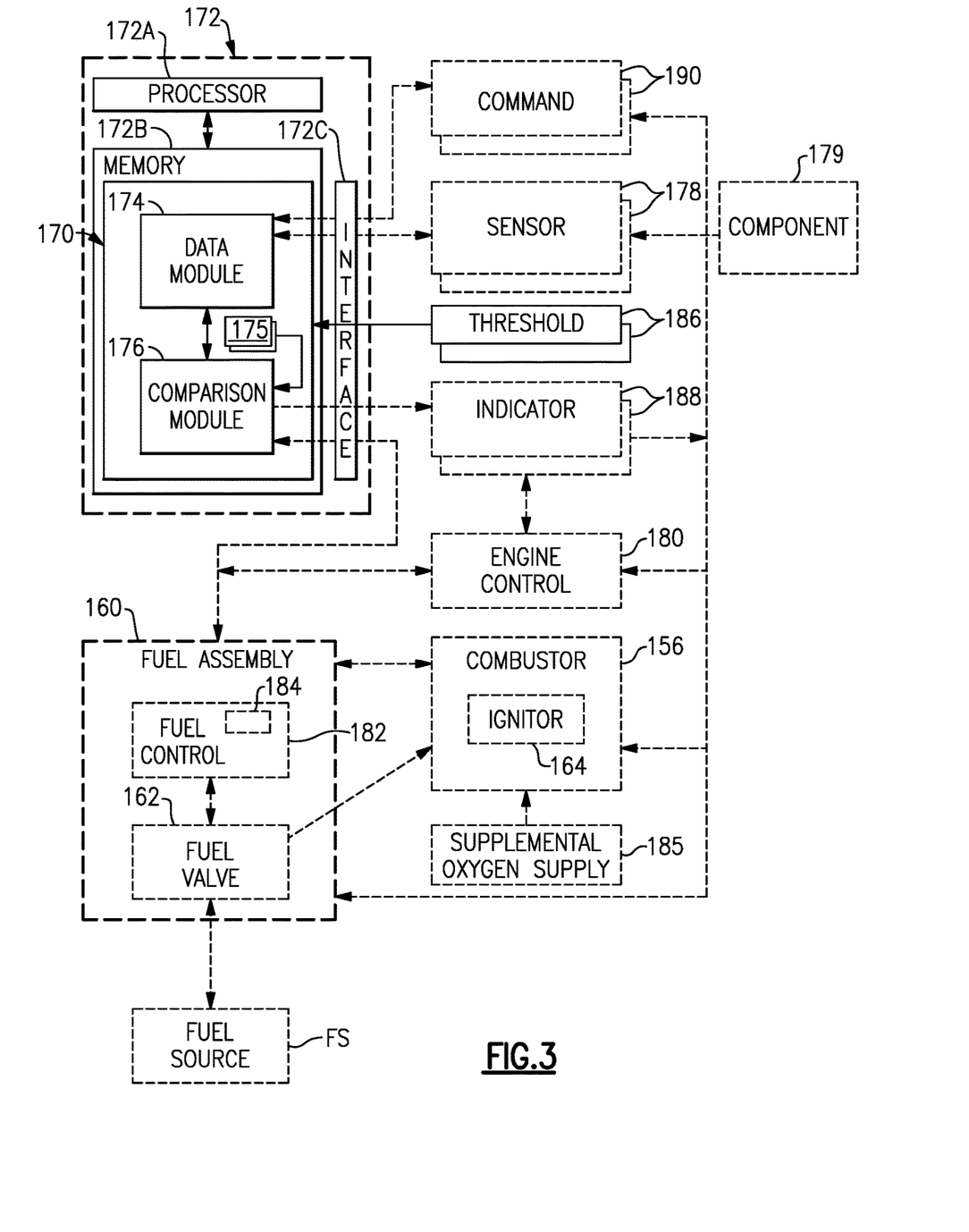
FIG. 3 illustrates a system for detecting an engine light-off event, according to an embodiment.

Referring to FIG. 3, with continued reference to FIGS. 1 and 2, a system 170 for engine light-off detection is shown, according to an embodiment. The system 170 can be used to determine the occurrence of an engine light-off condition or event of a gas turbine engine, such as one of the engines 10, 20. Although the teachings herein primarily refer to a two spool geared gas turbine engine, other engine architectures can benefit from the teachings herein, including direct drive and geared single spool and three spool architectures. In embodiments, an engine light-off event occurs when initial combustion in the combustor has occurred, hereinafter referred to as an initial ignition event. In other embodiments, an engine light-off event occurs when combustion in the combustor reaches a state in which the flame in the combustor can sustain itself without any further ignition source, hereinafter referred to as a sustained combustion event. The techniques disclosed herein can be utilized to determine the occurrence of an initial ignition event and/or a sustained combustion event.

The system 170 includes a data module 174 electronically coupled to and in communication with a comparison module 176. A controller 172 can be programmed to execute the data module 174 and the comparison module 176. The controller 172 typically includes a processor 172A, a memory 172B and an interface 172C. The processor 172A may, for example only, be any type of known microprocessor having desired performance characteristics. The memory 172B may, for example only, includes UVPROM, EEPROM, FLASH, RAM, ROM, DVD, CD, a hard drive, or other computer readable medium which may store data and the method for operation of the controller 172 of this description, including the functionality of the data module 174 and comparison module 176 which can include one or more instructions programmed in the memory 172B that are executable by the processor 172A during operation of the system 170. The interface 172C facilitates communication with the other systems or components of the engine 10, 20 or vehicle. In some embodiments, the controller 172 is a portion of a FADEC or EEC, another system, or a stand-alone system. In other embodiments, the controller 172 is an analog device that provides the functionality.

The data module 174 can be electrically coupled to one or more sensors 178 through signal line(s). Each sensor 178 is operable to detect one or more conditions of the engine 10, 20, such as a present rotational speed of a gas turbine engine component 179. In embodiments, the gas turbine engine component 179 is a rotatable shaft, such as the shaft 15 of the engine 10 or one of the shafts 40, 50 of the engine 20. The sensors 178 can include a probe or thermocouple operable to detect a present temperature of gases in the core flow path C or an exhaust stream E communicated from or otherwise exiting the turbine section 14, 28 of the respective engine 10, 20 (e.g., at point $P_{EGT}$ in FIG. 2). The "present" rotational speed or temperature corresponds to a signal sensed within a timeframe that accounts for signal propagation between the various components including the system 170 and respective sensor(s) 178.

The data module 174 is programmed to receive or otherwise access the data during one or more conditions or events associated with the component 179, such as an engine startup event prior to the occurrence of engine light-off. For the purposes of this disclosure, an "engine startup event" means a condition in which the engine is moved from rest at least until an engine light-off event occurs. In embodiments, a starter 55 (FIG. 2) is used to rotate one of the shafts 40, 50 during engine startup. The starter 55 can continue to provide assistance to rotate one of the shafts 40, 50 after the occurrence of the engine light-off event to further spool up the engine to a desired speed. Another example startup event can include a windmilling event associated with the fan section 11, 22. For the purposes of this disclosure, a "windmilling event" means a condition in which combustion in the engine is not occurring and incoming airflow causes the fan 11A, 42 to rotate.

The system 170 is in communication with one or more subsystems of the engine 10, 20 and/or aircraft incorporating the engine 10, 20, such as an engine control 180 (depicted in FIG. 2 at 80). In embodiments, the system 170 is integrated with or otherwise incorporated into the engine control 180. An example engine control 180 includes a FADEC or an EEC. In some embodiments, the engine control 180 initiates one or more subsequent start-up events or steps in response to the system 170 determining that an engine light-off event has occurred.

The system 170 communicates with a fuel assembly 160. The fuel assembly 160 includes a fuel control 182 coupled to a fuel valve 162. The fuel valve 162 is operable to meter flow between a fuel source FS and a combustor 156. The fuel control 182 is operable to modulate or otherwise move the fuel valve 162. The fuel control 182 can be programmed in a number of ways to modulate the fuel valve 162 for startup and an acceleration sequence of the engine 10, 20. For example, the fuel control 182 can be programmed with a predefined fuel schedule 184. The fuel schedule 184 is defined by a desired mixture of fuel and airflow during various conditions of the combustor 156, such as engine start-up, takeoff, cruise and approach conditions of the engine 10, 20, with the fuel control 182 programmed to modulate the fuel valve 162 according to the fuel schedule 184. The fuel schedule 184 may be incorporated as one or more lookup tables or equations in the fuel control 182.

In an embodiment, a supplemental oxygen source 185 supplies a flow of oxygen to the combustor 156. The supplemental oxygen source 185 can be an oxygen bottle that supplies oxygen during high altitude flight conditions to promote combustion during engine startup.

The comparison module 176 is programmed to compare the present rotational speed of the rotational gas turbine engine component 179 over a predefined time period and to determine an instantaneous rate of change or rise in an acceleration rate corresponding or otherwise relating to the present rotational speed. The comparison module 176 is programmed to determine whether or not an instantaneous rate of change in the acceleration rate meets at least one predetermined criterion. For the purposes of this disclosure, a rate of change of acceleration is calculated by taking a mathematical derivative of acceleration with respect to time, or a mathematical second derivative of velocity with respect to time, as is known.

The predetermined criterion can include one or more thresholds 186. The thresholds 186 can include one or more levels or ranges, such as at least one predetermined threshold. The predetermined threshold can be a single predefined acceleration rate of change or a predefined range of acceleration rate of changes with respect to time. Each threshold can be based upon at least one present flight condition of a vehicle incorporating the engine 10, 20, such as present altitude and present velocity. Each of the thresholds can be defined with respect to a single altitude and/or velocity or with respect to a discrete and non-overlapping range of altitudes and/or velocities. The acceleration rate can be defined as an acceleration rate (Ndot) relating to a present rotational speed (N) of the shaft 15 or one of the low speed and high speed spools 30, 32, such as one of the shafts 40, 50.

The comparison module 176 is programmed to determine that an engine light-off event has occurred in response to determining that an instantaneous rate of change (Ndot-dot) in the acceleration rate (Ndot) corresponding to the present rotational speed (N) of the respective shaft 15, 40, 50 meets the threshold(s).

A sudden change in the acceleration rate (Ndot) can occur at a moment of the engine light-off event, even if the engine 10, 20 is spooling up due to motoring by a starter or windmilling of the respective fan 11A, 42. The rotational speed information relating to the component 179 can be relatively more accurate and reliable and updated more frequently than other conditions of the engine 10, 20 that may be utilized to determine whether an engine light-off event has occurred, such as temperatures of the exhaust stream E. The rate of change (Ndot-dot) can be more responsive than changes in the present rotational speed (N), and therefore the rate of change (Ndot-dot) information can be utilized to more quickly determine whether an engine light-off event has occurred.

In embodiments, the comparison module 176 determines whether a rate of change (N1dot-dot) in an acceleration rate (N1dot) corresponding to a present rotational speed (N1) of shaft 15 or inner shaft 40 meets the threshold. In another embodiment, the comparison module 176 determines whether a rate of change (N2dot-dot) in a core acceleration rate (N2dot) corresponding to a present rotational core speed (N2) of the outer shaft 50 meets the threshold. In some scenarios, the present rotational speed (N2) of the outer shaft 50 is greater than the present rotational speed (N1) of the inner shaft 40, and an increase in the present rotational speed (N1) may lag an increase in the present rotational speed (N2) such that the rate of change (N2dot-dot) is relatively more responsive to an engine light-off event.

The comparison module 176 can be programmed to determine an average two or more values of the instantaneous rate of change (Ndot-dot) in the acceleration rate (Ndot) over a period of time. In an embodiment, the comparison module 176 is programmed to determine an average rate of change (Ndot-dot) that is based on a rolling average of the present rotational speed (N), such as 20-30 sample points over a duration of 100-200 milliseconds or less, for example. The comparison module 176 is programmed to compare the average rate of change (Ndot-dot) to the threshold. This technique can reduce sensitivity to sudden fluctuations or noise in the present rotational speed (N) information during engine operation, thereby improving the accuracy in determining that an engine light-off event has occurred.

In some embodiments, the comparison module 176 is programmed to cause one or more indicators 188 to be generated in response to determining that the predetermined criterion is met. At least one indicator 188 relates to an engine light-off event, including a calculated or estimated time that the respective engine light-off event occurred. The indicators 188 can be communicated to other subsystems of the engine 10, 20 or vehicle to indicate that various engine startup steps or modes can be commenced.

The comparison module 176 can be programmed to cause a fuel/air mixture to the combustor 156 to change in response to determining whether the predetermined criterion is met. For example, the comparison module 176 can be programmed to cause a flow rate of fuel between the fuel source FS and the combustor 156 to change in response to the rate of change (Ndot-dot) meeting the predetermined criterion according to the fuel schedule 184 (e.g., decreased). The comparison module 176 can cause the fuel scheduling to transition from an ignite fuel flow rate to an acceleration fuel flow rate once light-off occurs, for example.

The comparison module 176 can be programmed to corroborate the rate of change (Ndot-dot) information with condition(s) of the engine 10, 20, such as one or more commands 190 associated with the engine 10, 20. At least one command 190 can be associated with the combustor 156, such as a fuel flow command or signal to the fuel valve 162 and an ignition signal to an igniter 164.

The comparison module 176 can be programmed to corroborate or verify the determination of an engine light-off event with other information from the engine 10, 20 or vehicle. In some embodiments, a present temperature of gases in the exhaust stream E is measured by one of the exhaust gas temperature (EGT) probes or sensors 178 located adjacent to the exhaust stream E (FIGS. 1 and 2). The data module 174 is programmed to access data from the sensors 178 corresponding to the present temperature. The comparison module 176 is programmed to confirm or otherwise determine that an engine light-off event has occurred in response to comparing a change in the present temperature of the gases in the exhaust stream E to at least one predetermined criterion, such as at least one predetermined temperature threshold 186. An increase in the present temperature of the gases in the exhaust stream E may lag the rate of change (Ndot-dot) in the acceleration rate (Ndot).

In some embodiments, the comparison module 176 is programmed to determine whether an engine light-off event has occurred without determining a present temperature of the gases in the exhaust stream E, including being adapted to detect the engine light-off event without exhaust gas temperature data sensed by a thermocouple or EGT probe. An unexpected advantage of this technique is that it allows the engine 10, 20 to be free of any EGT probes or thermocouples, which can reduce system complexity, weight and cost.

Figure 4:
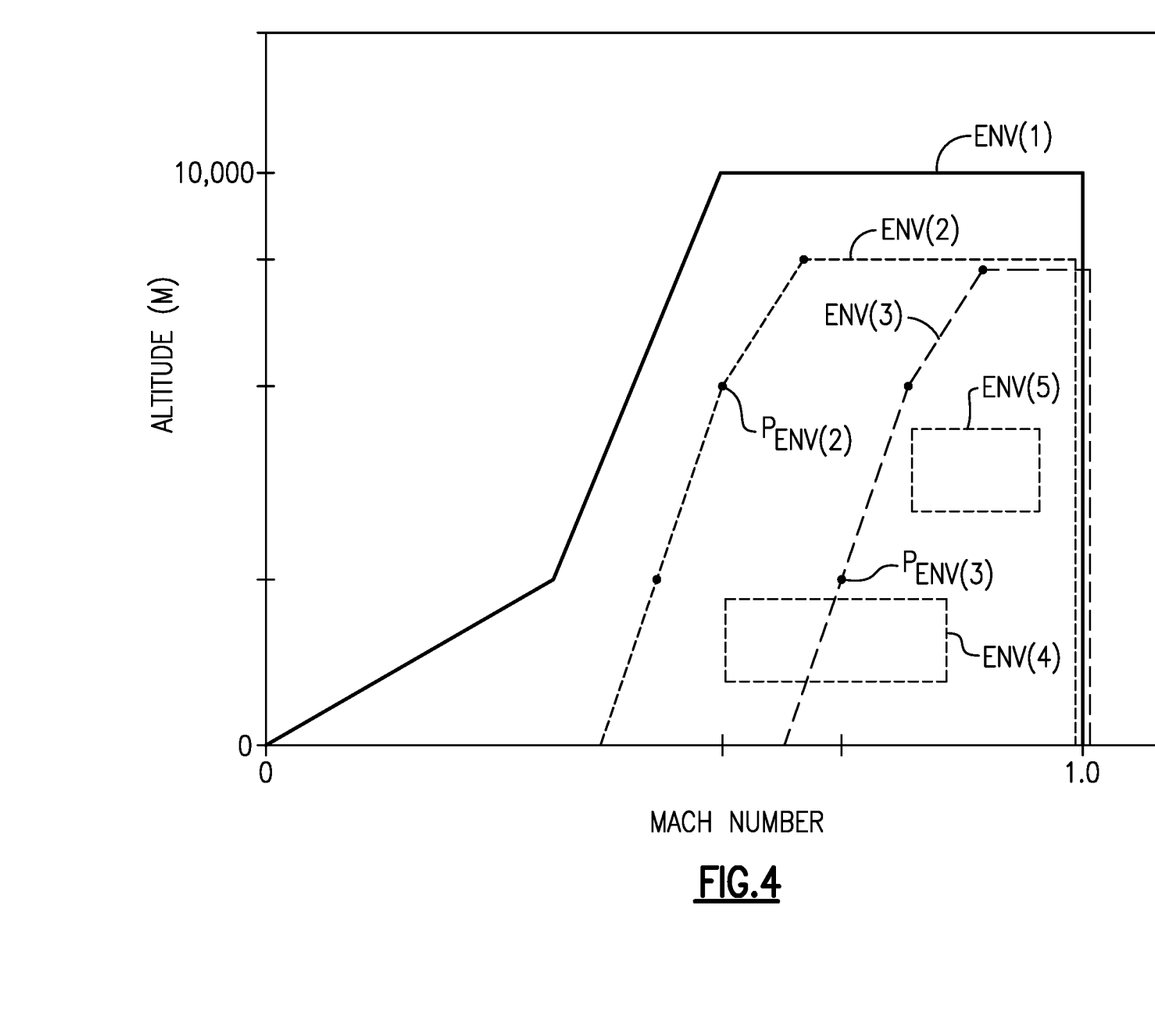
FIG. 4 illustrates a plot of operating envelopes for an engine, according to an embodiment.

FIG. 4 illustrates a plot of operating envelopes for an engine, according to an embodiment. Operating envelope ENV(1) may correspond to engine 10, 20, and is established with respect to Mach number and altitude. For example, the operating envelope ENV(1) may be defined up to about Mach 1.0, and up to an altitude of about 10,000 meters (m). It should be understood that the teachings herein can be utilized for subsonic and supersonic flight conditions.

Each vehicle incorporate the respective engine 10, 20 can have a respective operating envelope, including a starting envelope, established with respect to Mach number and altitude. For example, operating envelope ENV(2) may correspond to a first vehicle, and operating envelope ENV (3) may correspond to a second vehicle that has different performance characteristics or requirements. Operating envelope ENV(2) may correspond to a missile system that can be deployed from an aircraft at a relative lesser speed than another missile system corresponding to operating envelope ENV(3), for example.

Occurrence of an engine light-off event can depend on a present flight condition or environment of the vehicle incorporating the engine 10, 20, which can affect the conditions for combustion in the combustor section 13, 26. Each threshold can be based upon one or more flight conditions, including Mach number (or velocity) and/or altitude. Each threshold can be based on a configuration of the engine 10, 20, including a size or thrust rating of the engine and the presence of a supplemental oxygen source (e.g., 185 in FIG. 3). The presence of a supplemental oxygen source can result in an increased acceleration rate (Ndot).

Values relating to the expected occurrence of an engine light-off event with respect to flight condition can be stored in memory 172B as one or more lookup tables 175 (FIG. 3). The lookup tables 175 can include a matrix of predetermined thresholds each defined with respect to flight condition(s). The flight conditions can include predetermined values of altitudes and velocities each with respect to an expected rate of change (Ndot-dot) of the component 179, for example. In embodiments using rate of change (Ndot-dot), alone or in combination with other flight conditions, an unexpected advantage is reliability and precision in detecting engine light-off events that can permit embodiments of engines to be free of thermocouples or EGT probes. As discussed in more detail with respect to FIG. 6A below, a rise in present temperature of the exhaust stream E may lag an increase in the rate of change (Ndot-dot) during engine startup. The rate of change (Ndot-dot) information can therefore provide a relatively earlier indication of the occurrence of an engine light-off event. In other embodiments, each threshold is calculated using one or more physics models that are defined with respect to flight condition(s).

The comparison module 176 can be programmed to set or otherwise obtain the predetermined threshold(s) in response to comparing the present Mach number (or velocity) and/or the present altitude to respective values in the lookup tables 175. The values in the lookup tables can be determined through modeling and simulation or test data, for example.

Utilizing this technique, the controller 172 can more accurately determine whether and when an engine light-off event has occurred, and can cause the fuel control 182 to modulate the fuel valve 162 to adjust a fuel/air mixture in the combustor 156 that more closely matches the present flight condition of the vehicle incorporating the engine 10, 20, thereby improving propulsive efficiency.

Figure 5:
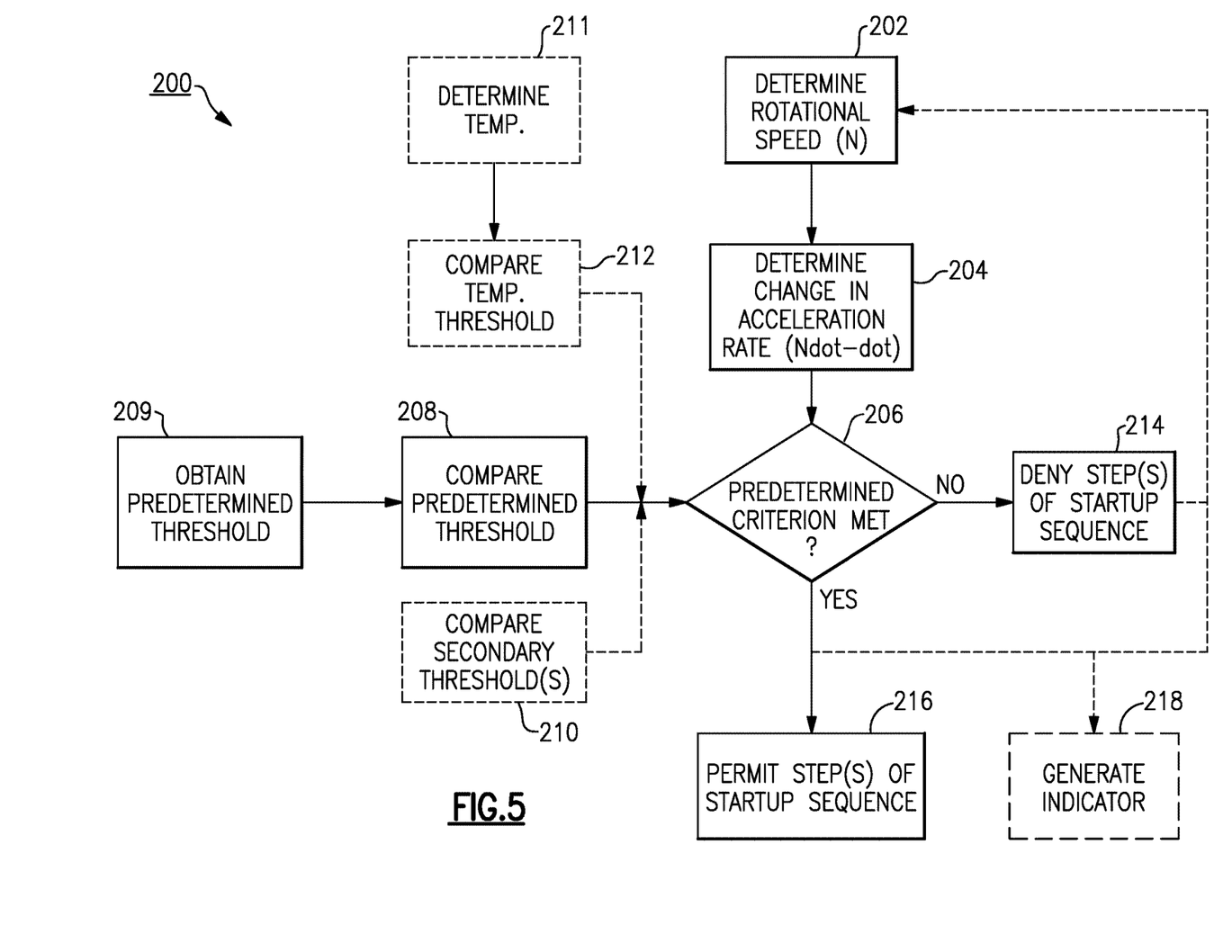
FIG. 5 illustrates an exemplary process for detecting an engine light-off event, according to an embodiment.

FIG. 5 illustrates a process or algorithm in a flowchart 200 for detecting an engine light-off event in a gas turbine engine, according to an embodiment. Controller 172 (FIG. 3) can be programmed to execute the algorithm for determining an engine light-off event for a gas turbine engine, such as one of engines 10, 20. Reference to the embodiments of FIGS. 2 and 3 is provided for illustrative purposes.

At step 202, a present rotational speed (N) of the component 179 is determined for one or more time periods. At step 204, an instantaneous rate of change (Ndot-dot) in acceleration rate (Ndot) is determined. At step 206, a comparison is made to determine whether or not at least one predetermined criterion is met. The predetermined criterion can include any of the predetermined criteria disclosed herein, including one or more thresholds. The determination at step 206 can occur at a precise time of the engine light-off event or relatively close in time to the actual occurrence. Unexpectedly, in some embodiments, the rate of change (Ndot-dot) can be utilized instead of acceleration rate (Ndot) to determine the occurrence of an engine light-off event.

Step 206 can include determining that an engine light-off event has occurred in response to comparing the rate of change (Ndot-dot) to at least one predetermined threshold at step 208. Step 208 can include comparing a single value of the rate of change (Ndot-dot) or a plurality of values to the threshold over a period of time. For example, the algorithm can include a front end filtering feature that determines that an engine light-off event has occurred in response to a set of values of the rate of change (Ndot-dot), such as a consecutive number of passes exceeding the threshold. The number of consecutive passes can include 5-10 instantaneous or average values of the rate of change (Ndot-dot) exceeding the threshold within a set time interval after the first instance exceeding the threshold (e.g., 100-200 milliseconds), for example. Each of the average values can be calculated from a sampling of instantaneous values each within a subset of the set time interval, or can be based on a rolling average of the rate of change (Ndot-dot), for example. These techniques can reduce a likelihood of falsely declaring an engine light-off event due to noise caused by transients or fluctuations in the speed (N) information.

The threshold(s) can be set or otherwise obtained at step 209 utilizing any of the techniques disclosed herein. The thresholds(s) can be based on flight condition such as present altitude and/or velocity, or a configuration of the engine such as a thrust rating of the engine and a presence of the supplemental oxygen source 185.

The method 200 can include comparing the present flight condition(s) to one or more predetermined secondary or absolute thresholds at step 210. The secondary thresholds can be defined with respect to values in which combustion is likely to occur (i.e., a relatively high confidence level), even if the rate of change (Ndot-dot) values do not exceed the threshold. The predetermined secondary thresholds can defined with respect to time, rotational speed (N) or temperature of gases in the exhaust stream E, for example.

Figure 6A:
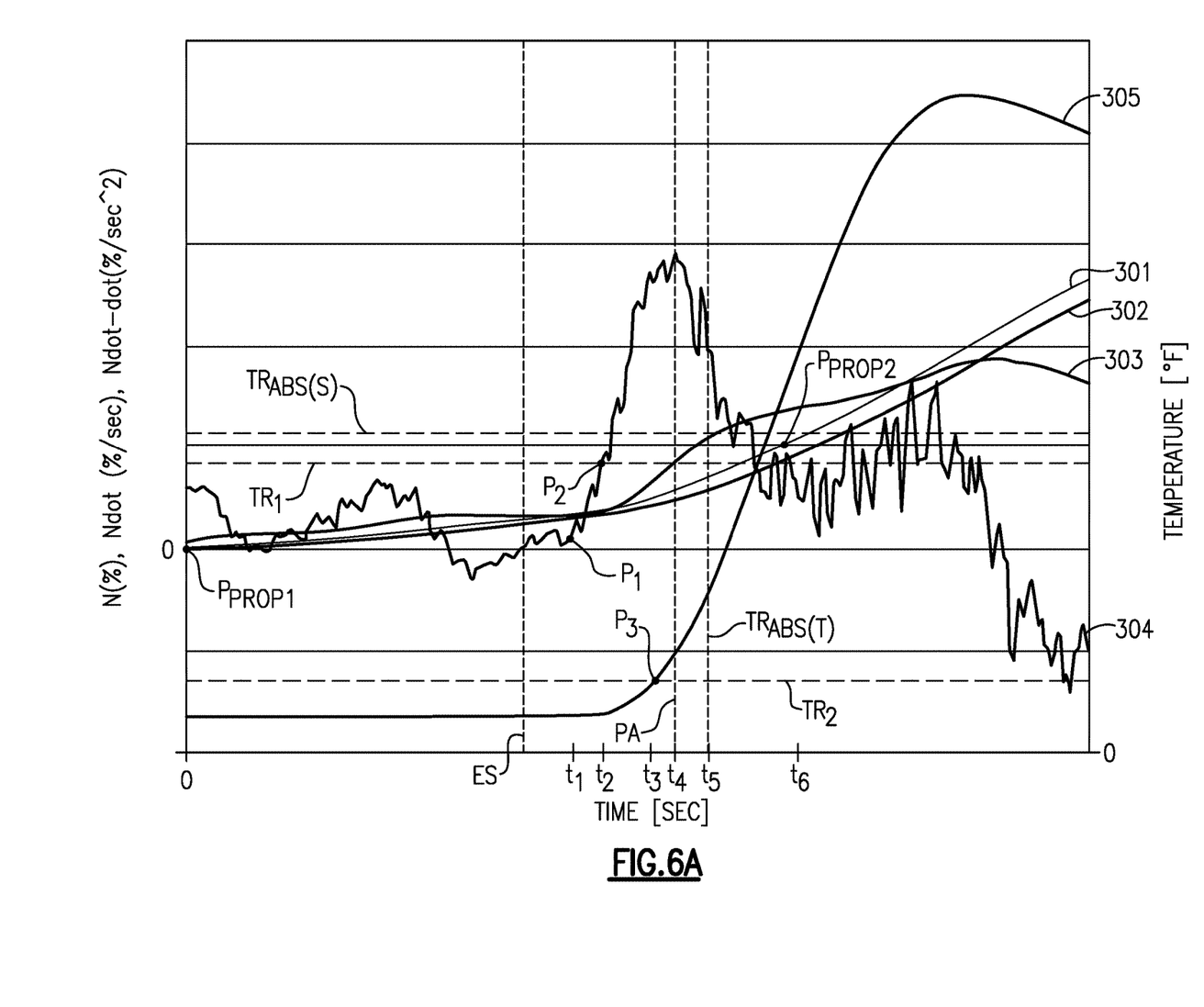
FIG. 6A illustrates an example plot of engine rotational speed, derivative values of rotational speed, and exhaust gas temperature, according to an embodiment.

In embodiments, the algorithm determines whether a present time meets a predetermined absolute time threshold (e.g., dashed line $TR_{ABS(T)}$ at time=$t_5$ in FIG. 6A). The predetermined criterion is met at step 206 in response the present time meeting the absolute time threshold. The time threshold can be defined with respect to commencement of engine startup or another condition, such as a duration since an "entry to ignition state" of the engine. An "entry to ignition state" corresponds to a condition in which ignition begins to occur in the combustor (see, e.g., dashed line ES in FIG. 6A).

Another secondary threshold can include an absolute speed threshold. The algorithm can determine whether the present or average speed (N) meets an absolute speed threshold (e.g., dashed line $TR_{ABS(S)}$ at time=$t_6$ in FIG. 6A).

In embodiments, the secondary thresholds include a proportional speed threshold. The combustor can react differently as a rotational speed (N) of the spool begins to increase. The proportional speed threshold can be based on speed (N) at a flight condition prior to an engine light-off event, such as the entry to ignition state, or based on present rotational speed (N). The proportional speed threshold can be met when the present rotational speed (N) exceeds approximately 5-10% of the baseline value (e.g., $P_{PROP2}$ relative to $P_{PROP1}$ in FIG. 6A), for example.

The secondary thresholds can be utilized to ensure that an engine light-off event is declared to allow subsequent steps in a startup sequence associated with the engine to be initiated, even if the rate of change (Ndot-dot) values do not exceed the threshold. The secondary thresholds can also be utilized to corroborate or verify a determination of an engine light-off event based on the rate of change (Ndot-dot) information, with the acceleration and secondary thresholds being different predetermined criteria.

In embodiments, a present temperature of gases in the exhaust stream E or core flow path C can be determined at step 211. The present temperature can be compared to predetermined temperature threshold(s) at step 212. Step 206 can include determining whether the present temperature exceeds the predetermined temperature threshold(s).

One or more steps or modes of a startup sequence associated with the engine comprising the component 172 can be denied at step 214 in response to determining that the predetermined criterion is not met at step 206. Step 214 can correspond to a lack of occurrence of an engine light-off event.

The algorithm can include declaring the occurrence of an engine light-off event in response to the predetermined criterion being met at step 206. Step(s) of a startup sequence associated with the engine can be initiated or otherwise permitted at step 216 in response to determining that the predetermined criterion is met at step 206. Step 216 can include causing a flow rate of fuel between the fuel source FS and the combustor 156 to change according to the fuel schedule 184, which can include modulation of fuel valve 162. At step 218, one or more indicators 188 can be generated in response to the predetermined criterion being met, and can be communicated to other portions of the engine or subsystems of the vehicle.

Figure 6B:
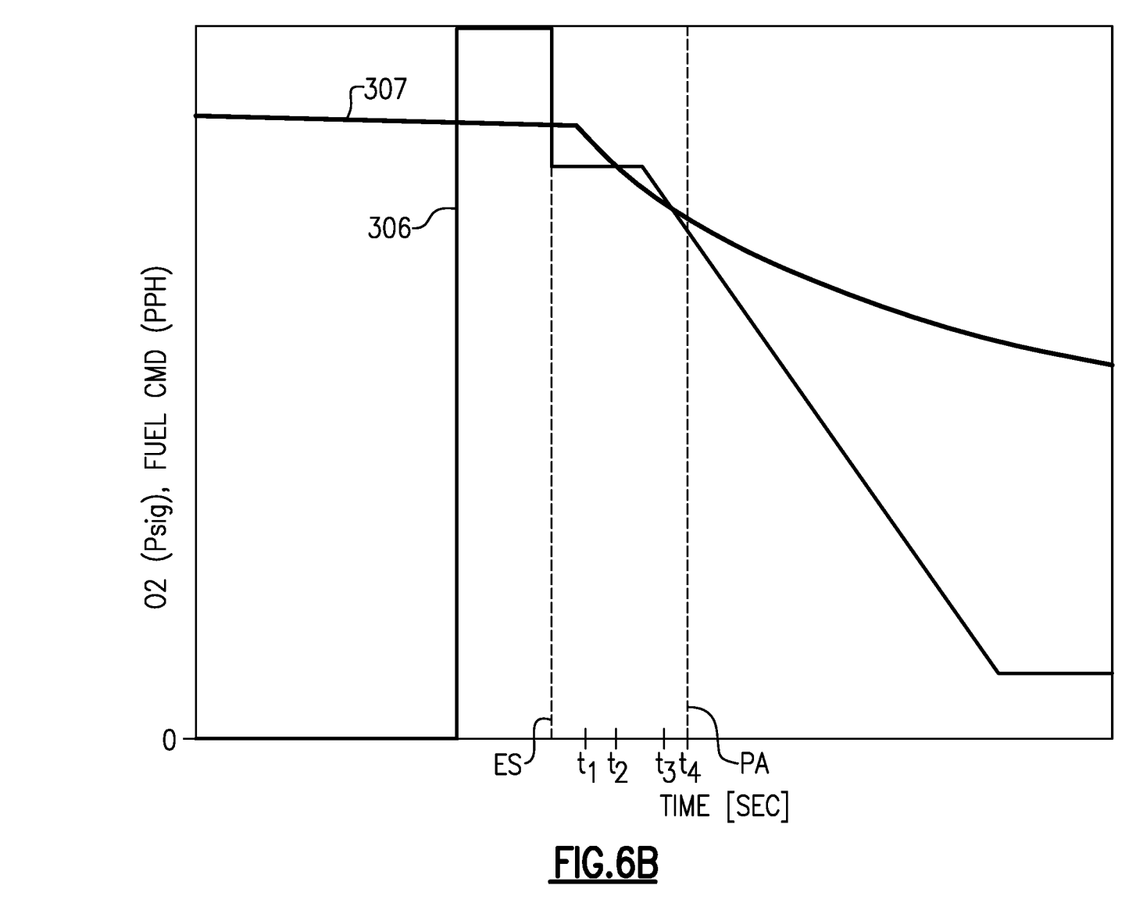
FIG. 6B illustrates an example plot of oxygen and fuel flow for portions of the plot of FIG. 6A, according to an embodiment.

Referring to FIGS. 6A and 6B, an example startup sequence including an engine light-off event for an engine is shown. FIG. 6A illustrates an example plot of rotational speed (N), acceleration rate (Ndot), rate of change (Ndot-dot) and exhaust gas temperature during engine operation that can correspond to execution of the algorithm in flowchart 200. The rotational speed (N), acceleration rate (Ndot), and rate of change (Ndot-dot) may correspond to instantaneous or average values. FIG. 6B illustrates an example plot of oxygen and fuel flow during the time period of FIG. 6A.

Curves 301, 302 correspond to instantaneous and average values of rotational speed (N), respectively, of a gas turbine engine component in units of rpm/second. Curves 303, 304 correspond to average values of acceleration rate (Ndot) and rate of change (Ndot-dot), respectively. Curve 305 corresponds to temperature of gases in an exhaust stream of the gas turbine engine in units of degrees Fahrenheit. Curves 301-305 may correspond to a single point in one of the operating envelopes ENV(1), ENV(2), ENV(3) of FIG. 4, such as point $P_{ENV(2)}$.

Curve 306 corresponds to values of a fuel command relating to a rate of flow of fuel in pounds per hour (PPH). Curve 307 corresponds to flow of oxygen (O2) from a supplemental oxygen source, measured in pounds per square inch, gage (Psig).

Dashed line ES corresponds to an entry to ignition state of the engine. Dashed line PA corresponds to a peak acceleration of the engine. Dashed line $TR_1$ corresponds to a predetermined threshold. Dashed line $TR_2$ corresponds to a predetermined temperature threshold.

Engine start-up is initiated at time=$t_0$, with values of rotational speed (N), acceleration rate (Ndot), rate of change (Ndot-dot) and temperature generally rising subsequent to time=$t_0$ as the engine begins to spool. The rate of change (Ndot-dot) exceeds the predetermined threshold at time=$t_2$, corresponding to the intersection of curve 304 and dashed line $TR_1$ at point $P_2$. The relatively steep rate of change (Ndot-dot) between point $P_1$ at time=$t_1$ and point $P_2$ at time=$t_2$ is caused by the occurrence of an engine start-up event, which occurs prior to peak acceleration at time=$t_4$. The relatively steep rate of change (Ndot-dot) represents an initial inflection of speed as the combustor transitions from a non-lit state to a lit state and is also due to an increase in torque that the added combustion provides.

An engine light-off event can be declared at point $P_2$. Under some scenarios, the rise in present temperature may lag the increase in the rate of change (Ndot-dot). The declaration can be confirmed by the rise in present temperature at time=$t_3$ exceeding the predetermined temperature threshold, corresponding to the intersection of curve 305 and dashed line $TR_2$ at point $P_3$.

As illustrated in FIG. 6B, fuel flow is maximized prior to the entry to ignition state (dashed line ES) to fill the fuel manifold of the combustor 156 with fuel, and is reduced once the entry to ignition state occurs to more closely align with rotational speed (N). Fuel flow is further reduced once the engine light-off event is determined to adjust the fuel/air mixture in the combustor 156.

Figure 7:
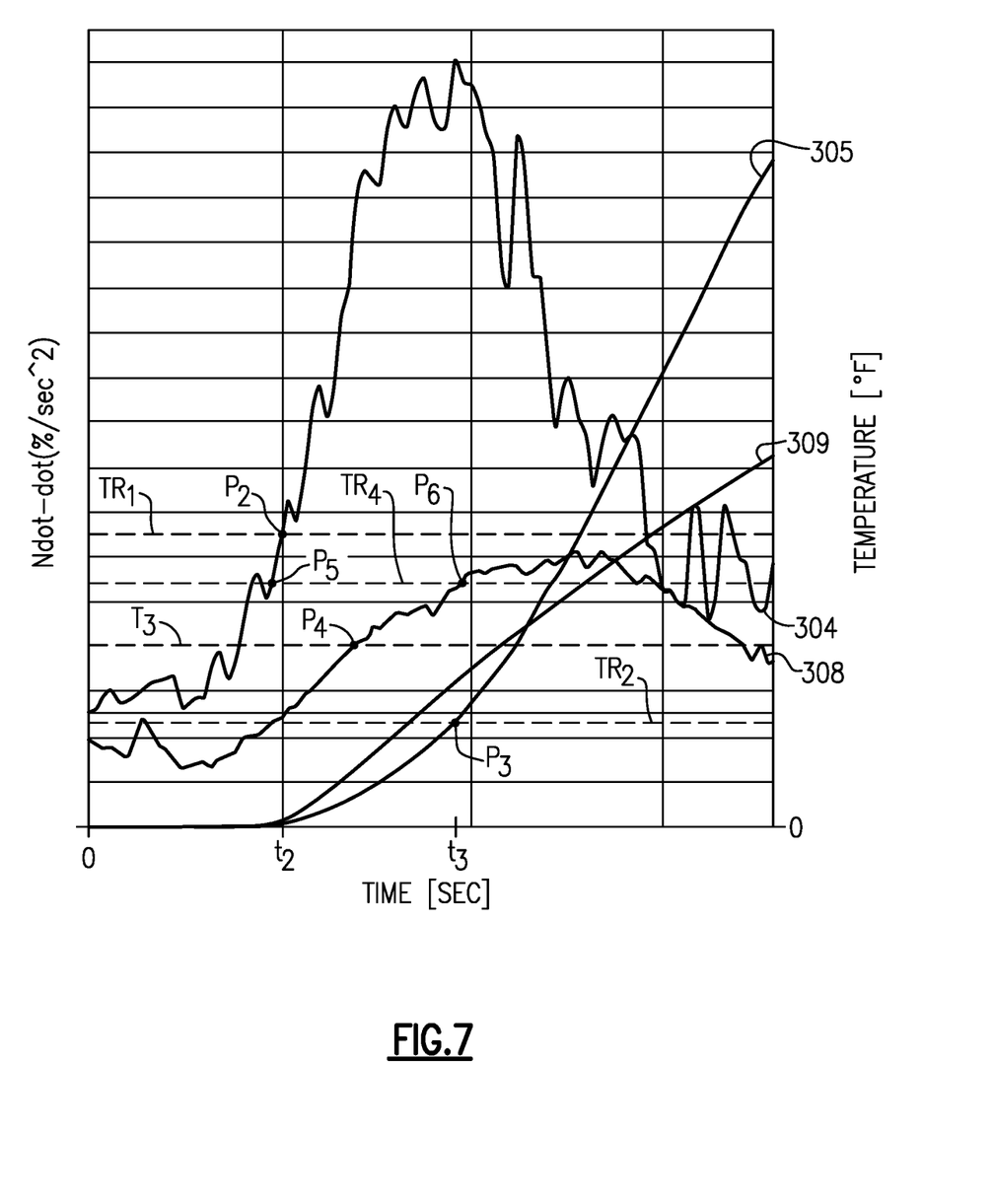
FIG. 7 illustrates an example plot of engine rotational speed, derivative values of rotational speed, and exhaust gas temperature for two different operating conditions, according to an embodiment.

As previously discussed, each predetermined criterion including the thresholds can be set with respect to the performance characteristics or requirements of the engine, or the vehicle incorporating the engine. FIG. 7 illustrates an example plot of rate of change (Ndot-dot) values for two different sets of flight conditions, such as point $P_{ENV(2)}$ and point $P_{ENV(3)}$ in FIG. 4. In the illustrated embodiment, $P_{ENV(2)}$ is characterized by curves 304, 305 (also shown in FIG. 6A). $P_{ENV(3)}$ is characterized by curves 308, 309, which correspond to rate of change (Ndot-dot) and present temperature of gases in an exhaust stream of the gas turbine engine, respectively.

As illustrated in FIG. 7, $P_{ENV(3)}$ is associated with a relatively slower acceleration rate (Ndot), yielding a relatively less steep rate of change (Ndot-dot) as depicted by curve 308, in comparison to curve 304 of $P_{ENV(2)}$. A different predetermined threshold can be defined for $P_{ENV(3)}$, such as dashed line $TR_3$. An engine light-off event can be declared for $P_{ENV(3)}$ at point P3, defined by an intersection of curve 308 and dashed line $TR_3$ which occurs after time=$t_2$. In embodiments, a single predetermined threshold can be utilized for more than one or each flight condition, such as dashed line $TR_4$, with a declaration of an engine light-off event at point $P_5$ for $P_{ENV(2)}$ or $P_6$ for $P_{ENV(3)}$. The single threshold can represent a worst-case scenario for expected flight conditions and acceleration rates during engine startup, even if the engine is operated at a different set of flight conditions.

It should be understood that relative positional terms such as "forward," "aft," "upper," "lower," "above," "below," and the like are with reference to the normal operational attitude of the vehicle and should not be considered otherwise limiting.

Although the different embodiments and examples have the specific components shown in the illustrations, embodiments of this disclosure are not limited to those particular combinations. It is possible to use some of the components or features from one of the embodiments and examples in combination with features or components from another one of the embodiments and examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
a spool including a rotor shaft interconnecting a compressor and a turbine;
a combustor section including a combustor in communication with a fuel assembly, the fuel assembly including a fuel valve coupling the combustor to a fuel supply; and
a controller in communication with the fuel assembly, the controller programmed to receive data corresponding to a present rotational speed of the spool and data corresponding to at least one present flight condition, and programmed to cause a flow rate from the fuel valve to change in response to determining that a rate of change in an acceleration rate relating to the present rotational speed meets at least one predetermined threshold;
wherein the at least one predetermined threshold relates to an engine light-off event of the combustor and is based upon the at least one present flight condition;
wherein the controller is coupled to a plurality of sensors that detect the present rotational speed and the at least one present flight condition, the controller further comprises a computing device including memory and a processor, the computing device programmed to execute a data module and a comparison module, the data module is programmed to access the data corresponding to the present rotational speed and the at least one present flight condition, and the comparison module is programmed to cause an indicator to be generated in response to determining that the rate of change in the acceleration rate meets the at least one predetermined threshold, the indicator relating to the engine light-off event;
wherein the at least one present flight condition includes a present altitude and a present velocity, and the comparison module is programmed to set the at least one predetermined threshold in response to comparing the present altitude and the present velocity to respective lookup tables that include values of predetermined altitudes and predetermined velocities each with respect to rate of change in acceleration rate of the rotor shaft;
wherein the comparison module is programmed to compare an average of two or more values of the rate of change in the acceleration rate to the at least one predetermined threshold, and is programmed to cause the flow rate to change in response to determining that an average of a plurality of values meets the at least one predetermined threshold; and
wherein the comparison module is programmed to cause the flow rate from the fuel valve to change in response to comparing the rate of change in acceleration rate and at least one command associated with the combustor, and the at least one command includes a fuel flow signal to the fuel valve and an ignition signal to an ignitor of the combustor.

2. The gas turbine engine as recited in claim 1, wherein the fuel valve is responsive to a predefined fuel schedule programmed in a fuel control.

3. The gas turbine engine as recited in claim 1, wherein the controller is adapted to detect the engine light-off event without exhaust gas temperature data sensed by a thermocouple or exhaust gas temperature probe.

4. The gas turbine engine as recited in claim 1, further comprising:
a fan including a plurality of fan blades; and
a second spool that drives the fan, the second spool including a second rotor shaft interconnecting a second compressor and a second turbine.

5. The gas turbine engine as recited in claim 1, wherein the controller is programmed to cause the flow rate to change in response to determining that a consecutive number of instances of the rate of change in the acceleration rate meets the at least one predetermined threshold.

6. The gas turbine engine as recited in claim 1, wherein the engine light-off event is an initial ignition event.

7. The gas turbine engine as recited in claim 1, wherein the engine light-off event is a sustained combustion event.

8. The gas turbine engine as recited in claim 2, wherein the engine light-off event is a sustained combustion event.

9. The gas turbine engine as recited in claim 2, wherein the engine light-off event is an initial ignition event or a sustained combustion event.

10. The gas turbine engine as recited in claim 9, wherein the controller is adapted to detect the engine light-off event without exhaust gas temperature data sensed by a thermocouple or exhaust gas temperature probe.

11. The gas turbine engine as recited in claim 9, further comprising:
   a fan including a plurality of fan blades; and
   a second spool that drives the fan, the second spool including a second rotor shaft interconnecting a second compressor and a second turbine.

12. The gas turbine engine as recited in claim 9, wherein the controller is programmed to cause the flow rate to change in response to determining that a consecutive number of instances of the rate of change in the acceleration rate meets the at least one predetermined threshold.

13. The gas turbine engine as recited in claim 9, further comprising a fan including a plurality of fan blades, and an outer housing that surrounds the fan blades to define a bypass duct.

14. The gas turbine engine as recited in claim 13, wherein the compressor is a high pressure compressor, the turbine is a high pressure turbine.

15. The gas turbine engine as recited in claim 14, wherein the engine light-off event is the sustained combustion event.

16. The gas turbine engine as recited in claim 14, further comprising a second spool that drives the fan, the second spool including a second rotor shaft interconnecting a low pressure compressor and a fan drive turbine.

17. The gas turbine engine as recited in claim 16, further comprising:
   a geared architecture that drives the fan at a lower speed than a speed of the second spool.

18. The gas turbine engine as recited in claim 17, wherein the geared architecture is an epicyclic gear train.

19. The gas turbine engine as recited in claim 18, wherein the engine light-off event is the sustained combustion event.

* * * * *